US008633753B2

(12) United States Patent
Chae

(10) Patent No.: US 8,633,753 B2
(45) Date of Patent: Jan. 21, 2014

(54) CLOCK DISTRIBUTION SYSTEM AND METHOD FOR A MULTI-BIT LATCH

(75) Inventor: Hyungil Chae, Ann Arbor, MI (US)

(73) Assignee: Analog Devices, Inc., Norwood, MA (US)

( * ) Notice: Subject to any disclaimer, the term of this patent is extended or adjusted under 35 U.S.C. 154(b) by 37 days.

(21) Appl. No.: 13/369,698

(22) Filed: Feb. 9, 2012

(65) Prior Publication Data

US 2013/0207698 A1  Aug. 15, 2013

(51) Int. Cl.
*H03K 3/00* (2006.01)
(52) U.S. Cl.
USPC ............ 327/295; 327/291; 327/565; 326/101
(58) Field of Classification Search
USPC .............. 327/291–295, 564–565; 326/93, 96, 326/101
See application file for complete search history.

(56) References Cited

U.S. PATENT DOCUMENTS

| 4,221,979 | A  |   | 9/1980  | Ahmed             |         |
|-----------|----|---|---------|-------------------|---------|
| 5,086,414 | A  |   | 2/1992  | Nambu             |         |
| 5,404,311 | A  |   | 4/1995  | Isoda             |         |
| 5,923,188 | A  | * | 7/1999  | Kametani et al.   | 326/93  |
| 6,111,446 | A  |   | 8/2000  | Keeth             |         |
| 6,323,716 | B1 | * | 11/2001 | Sakamoto          | 327/415 |
| 6,781,537 | B1 |   | 8/2004  | Taraschuk et al.  |         |
| 6,784,715 | B2 | * | 8/2004  | Campbell          | 327/295 |
| 8,103,898 | B2 | * | 1/2012  | Dimitriu et al.   | 713/500 |
| 2002/0180589 | A1 | | 12/2002 | Gabara         |         |
| 2006/0133158 | A1 | | 6/2006  | Shin           |         |
| 2007/0188367 | A1 | | 8/2007  | Yamada         |         |
| 2010/0225353 | A1 | | 9/2010  | Chang et al.   |         |

OTHER PUBLICATIONS

PCT International Search Report and Written Opinion for PCT/US2013/25368 mailed on May 20, 2013.

* cited by examiner

*Primary Examiner* — An Luu
(74) *Attorney, Agent, or Firm* — Kenyon & Kenyon, LLP

(57) ABSTRACT

A clock distribution system for a multi-bit latch. The clock distribution system may include a plurality of branches, each connected to a common clock input. Each branch may be driven by an input clock buffer. Each branch may be connected to clock inputs of a predetermined number of latch stages within the multi-bit latch. A predetermined number of clock branches may include a clock output buffer. The number of clock output buffers may be less than the total number of latch stages. In this manner the clock distribution system may reduce the feed through capacitance of the latch stages, which may mitigate the latch transition skew for each latch stage.

17 Claims, 4 Drawing Sheets

100

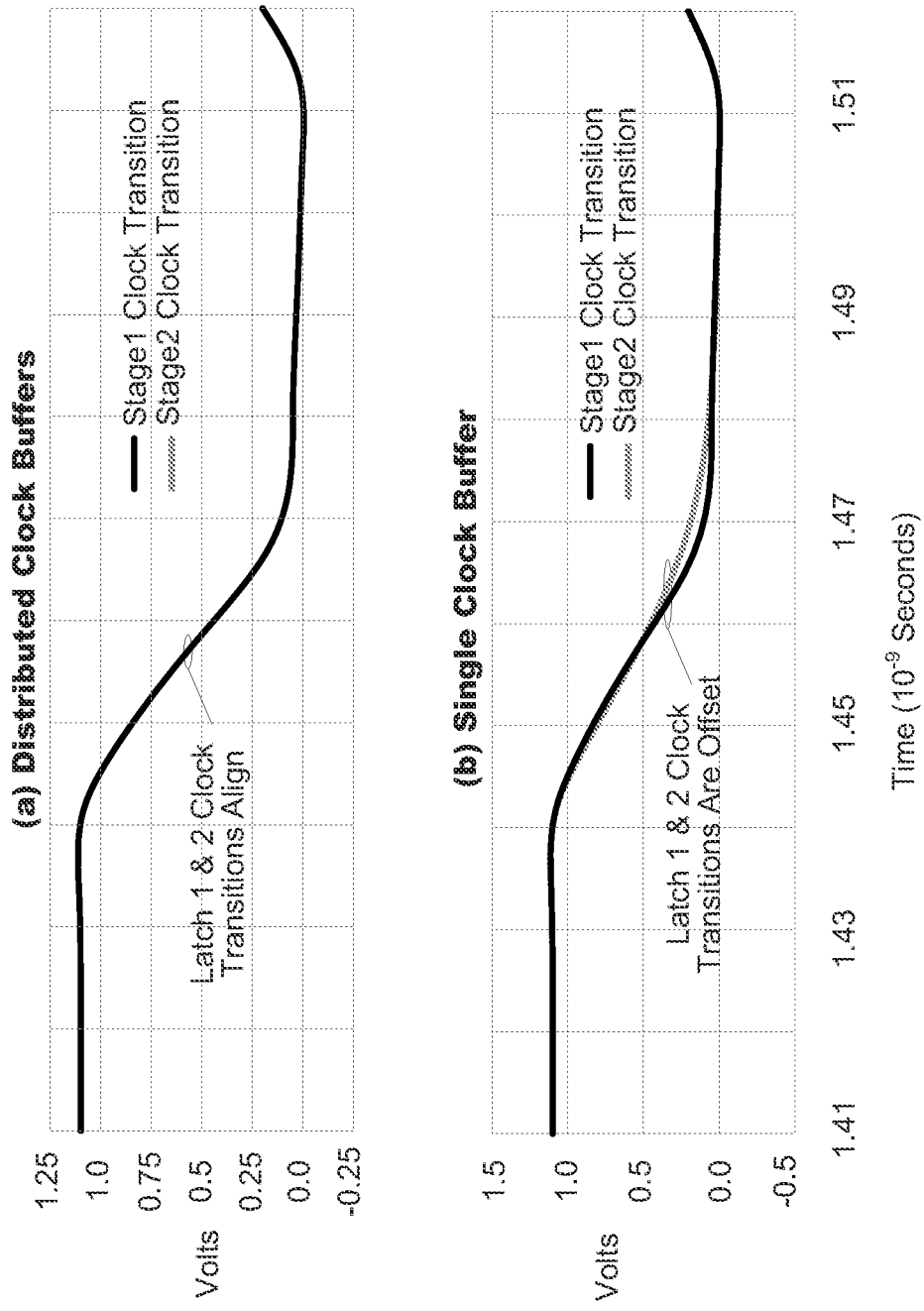

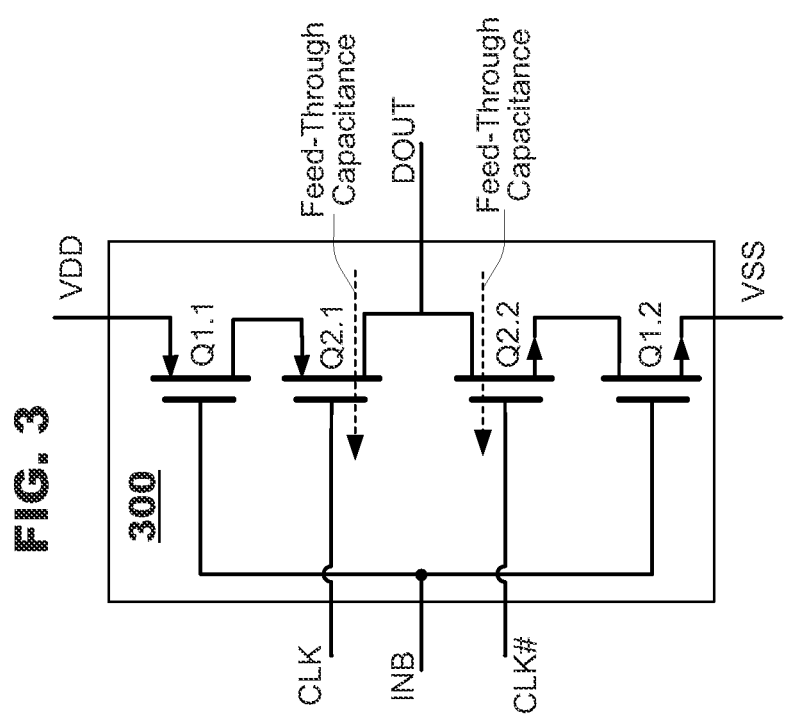

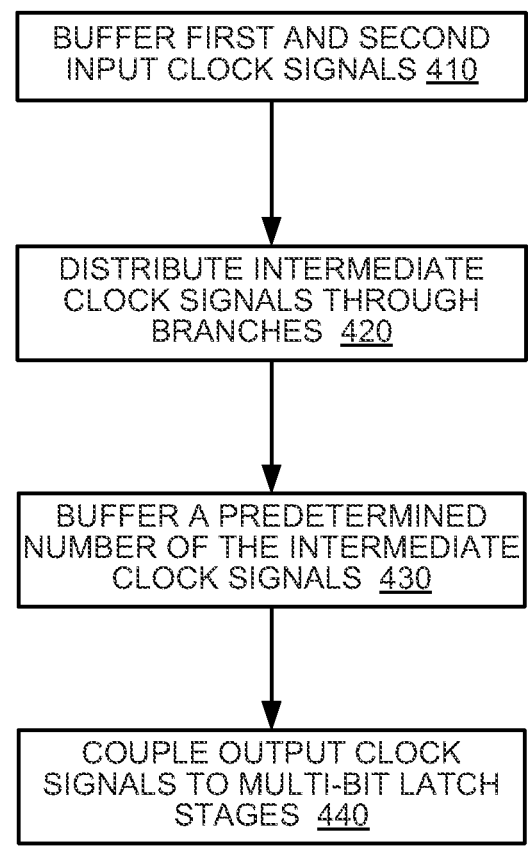

CLOCK DISTRIBUTION SYSTEM AND METHOD FOR A MULTI-BIT LATCH

BACKGROUND

The present invention relates to a clock distribution system for a multi-input system.

For example, a multi-bit latch includes individual latch stages for each bit of a multi-bit input signal. Typically, each latch stage receives a true and a complement input clock signal in common. Each latch stage outputs a corresponding data signal according to clock states of the input clocks.

Transistors within latch circuits are susceptible to gate-to-drain feed-through capacitance, which creates an interdependency between the input clock signals and a corresponding input bit for a latch stage. Transitions of the input clock signals vary based on the state of the input bit which can cause errors in transitions of output data signals generated by the latch stage. Since each latch stage shares the true and complement input clock signals in common, the errors produced by feed-through capacitance for each bit-wise latch propagates across all latch stages for the multi-bit latch. This compounds the output data errors for the multi-bit latch.

Current solutions for overcoming feed-through capacitance errors often involve providing cascaded latch stages for each bit of the multi-bit input signal. However, such solutions increase the silicon area and power consumption for multi-bit latches. As the bit width of a multi-bit latch increases, the increase in silicon area and power consumption scale in kind.

Accordingly, there is a need in the art for a more efficient clock distribution system that minimizes feed-through capacitance errors for a multi-bit latch.

BRIEF DESCRIPTION OF THE DRAWINGS

FIG. 2 is a diagram simulating clock transitions for a pair of multi-bit latch stages using a clock distribution system according to an embodiment of the present invention versus clock transitions for a pair of multi-bit latch stages without the clock distribution system.

FIG. 3 illustrates a stage for a multi-bit latch stage according to an embodiment of the present invention.

FIG. 4 illustrates a method for conditioning clock signals for a multi-bit latch according to an embodiment of the present invention.

DETAILED DESCRIPTION

Figure 1:
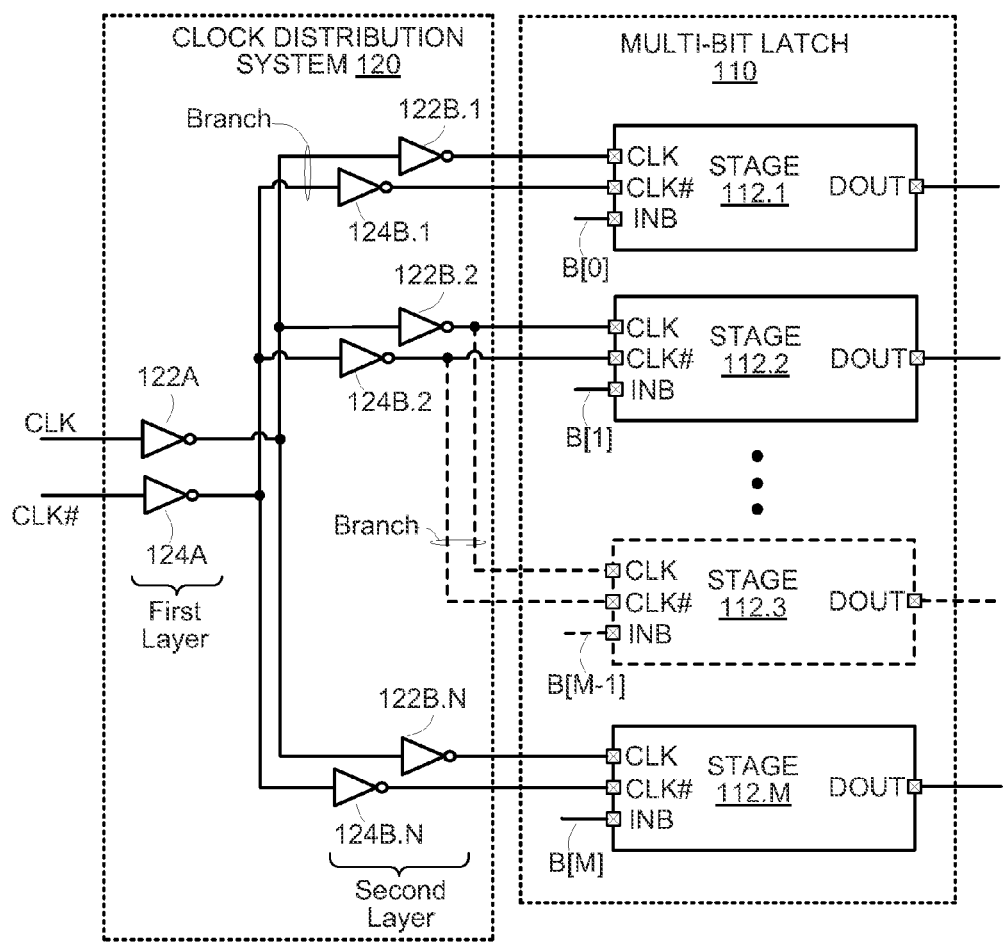
FIG. 1 illustrates a clock conditioning system for a multi-bit latch according to an embodiment of the present invention.

Embodiments of the present invention provide a clock distribution system for a multi-bit latch. The clock distribution system may include a plurality of branches, each connected to a common clock input. Each branch may be driven by an input clock buffer. Each branch may be connected to clock inputs of a predetermined number of latch stages within the multi-bit latch. A predetermined number of clock branches may include a clock output buffer. The number of clock output buffers may be less than the total number of latch stages. In this manner the clock distribution system may reduce the feed through capacitance of the latch stages, which may mitigate the latch transition skew for each latch stage.

FIG. 1 illustrates a clock conditioning system 100 for a multi-bit latch according to an embodiment of the present invention. As illustrated in FIG. 1, the conditioning system 100 may include a multi-bit latch 110 and a clock distribution system 120. The multi-bit latch 110 may have a plurality of latch stages 112.1-112.M corresponding to a bit width M. Each latch stage may have inputs INB for an input bit, and true and complement versions of a clock signal CLK, CLK#. Each latch stage 112.1-112.M may receive a corresponding input bit B[0]-B[M] from a multi-bit input signal. Each stage 112.1-112.M may generate a corresponding output data signal from an output DOUT.

The clock distribution system 120 may have a pair of inputs coupled to a source of the true and complement clock signals CLK, CLK#. The clock distribution system 120 may include a pair of input clock buffers 122A, 124A. The input clock buffers 122A, 124A may represent a first layer of clock buffers. A first input clock buffer 122A may be coupled to the true clock signal CLK and a second input clock buffer 124A may be coupled to the complement clock signal CLK#.

The clock distribution system 120 may include a plurality of clock distribution branches, each having a corresponding pair of output clock buffers 122B.1-122B.N, 124B.1-124B.N. The output clock buffers 122B.1-122B.N, 124B.1-124B.N may represent a second layer of clock buffers. Each of a first output clock buffer 122B.1-122B.N may be coupled between the true input clock buffer 122A and a corresponding true clock signal CLK output. Each of a second output clock buffer 124B.1-124B.N may be coupled between the complement clock input buffer 124A and a corresponding complement clock signal CLK# output. Outputs of the clock buffers 122B.1-122B.N, 124B.1-124B.N may be connected to the CLK and CLK# inputs of the latch stages 112.1-112.M During operation, the clock distribution system 120 may receive the true and complement clock input signals CLK, CLK# at the corresponding first and second input clock buffers 122A, 124A. The clock distribution system 120 may distribute the clock signals through various clock distribution branches. As discussed above, each branch may include a corresponding true output clock signal buffer 122B.1-122B.N and a complement output clock signal buffer 124B.1-124B.N through which corresponding buffered clock signals may flow. The outputs of each branch may be coupled to clock inputs of corresponding multi-bit latch stages 112.1-112.M.

A variety of clock distribution structures are available to circuit designers. In a first embodiment, there may be a pair of output buffers for each latch stage (e.g., output buffers 122B.1, 124B.1 for latch stage 112.1; output buffers 122B.2, 124B.2 for latch stage 112.2; etc.). The number of true output clock signal buffers 122B.1-122B.N and the number of complement output clock signal buffers 124B.1-124B.N would equal to the number of stages 112.1-112.M. Thus, each stage 112.1-112.M may have its input clock signals conditioned by an independent branch of the clock distribution system 120.

In another embodiment, there may be a single pair of output buffers for plural latch stages (e.g., output buffers 122B.1, 124B.1 for latch stages 112.1, 112.2; output buffers 122B.3, 124B.4 for latch stages 112.3, 112.4; etc.). The number of true output clock signal buffers 122B.1-122B.N and the number of complement output clock signal buffers 124B.1-124B.N may be less than the number of stages 112.1-112.M. Having fewer clock signal buffers than the number of stages may minimize the silicon area required to implement the clock distribution system 120.

Although two layers of clock buffers are illustrated, the clock distribution system 120 may be configured with more layers of clock buffers. In an embodiment, the input clock buffers 122A, 124A may be configured as inverting buffers. In an embodiment, the output clock buffers 122B.1-122B.N, 124B.1-124B.N may be configured as inverting buffers. However, the buffers for each layer may also be configured as non-inverting buffers. In an embodiment, the multi-bit latch 110 may be manufactured in a digital-to-analog converter ("DAC").

FIG. 2 is a diagram 200 simulating clock transitions for a pair of multi-bit latch stages using a clock distribution system according to an embodiment of the present invention versus clock transitions for a pair of multi-bit latch stages without the clock distribution system.

FIG. 2(a) illustrates a diagram simulating clock transitions for a pair of latch stages STAGE1, STAGE2 using a clock distribution system according to an embodiment of the present invention. For the simulation illustrated in FIG. 2(a), each latch stage may have a corresponding second output clock buffer, say, for a true clock signal, coupled to its true clock signal input. As illustrated, the clock transitions for each stage approximately align (overlap each other).

FIG. 2(b) illustrates a diagram simulating clock transitions for the pair of latch stages STAGE1, STAGE2 without using the clock distribution system. For the simulation illustrated in FIG. 2(b), a single output clock buffer, say, for a true clock signal, may be used with its output coupled to each latch stage's true clock signal input. As illustrated in FIG. 2(b), the clock transitions for each stage are skewed from each other.

For the simulation configuration as illustrated in FIG. 2(a) having distributed clock signal inverters, the clock skew between the stages is approximately 60 fS. For the simulation configuration as illustrated in FIG. 2(b) having a single clock signal inverter, the clock skew between the stages is approximately 170 fS. Thus, the clock skew between stages using a clock distribution according to an embodiment of the present invention is an FIG. 2(a) is improved over clock skew using a single clock signal inverter having its output coupled to each stages' clock input as in FIG. 2(b).

FIG. 3 illustrates a latch stage 300 for a multi-bit latch according to an embodiment of the present invention. As illustrated in FIG. 3, the stage 300 may include a pair of input transistors Q1.1, Q1.2 having control inputs coupled to input terminals for receiving an input bit INB. The stage may include a pair of clocking transistors Q2.1, Q2.2, each having corresponding control inputs coupled to input terminals for receiving one of a true and complement input clock signal CLK, CLK#.

A first input transistor Q1.1 may have a source coupled to a first source potential, labeled "VDD," and a drain coupled to the source of a first clocking transistor 2.1. A second input transistor Q1.2 may have a source coupled to a second source potential, labeled "VSS," and a drain coupled to the source of a second clocking transistor Q2.2. The clocking transistors Q2.1, Q2.2 may have drains commonly coupled to an output terminal for generating an output data signal DOUT for the stage 300.

During operation, each clocking transistor Q2.1, Q2.1 may be activated or deactivated depending on the states of its received clock input signal CLK, CLK#. For example, clocking transistor Q2.1 may be activated according to the state of the input clock signal CLK. When the clocking transistor Q2.1 may be activated, it may generate an output data signal DOUT which may represent a corresponding level of the input bit signal INB.

As illustrated, feed through capacitance may propagate through the drain-to-gate path of the clocking transistors Q2.1, Q2.2. The amount of feed through capacitance realized by each clocking transistor Q2.1, Q2.2 may be impacted by the signal level of the output data signal DOUT as well the signal level of the input bit signal INB, which may control input transistors Q1.1, Q1.2. The feed through capacitance may affect the transitions of the clock signals CLK, CLK#, which, in turn, may affect the level of the output data signal DOUT.

FIG. 4 illustrates a method 400 for conditioning clock signals for a multi-bit latch according to an embodiment of the present invention. The method 400 may buffer a first and second clock input signal to generate intermediate first and second clock signals (block 410). The method 400 may distribute the first and second intermediate clock signals through a predetermined number of clock distribution branches (block 420). The method 400 may buffer a predetermined number of the intermediate clock signals to generate output clock signals (block 430). The method 400 may distribute the output clock signals to stages of the multi-bit latch (block 440).

Several embodiments of the present invention are specifically illustrated and described herein. However, it will be appreciated that modifications and variations of the present invention are covered by the above teachings. In other instances, well-known operations, components and circuits have not been described in detail so as not to obscure the embodiments. It can be appreciated that the specific structural and functional details disclosed herein may be representative and do not necessarily limit the scope of the embodiments.

Those skilled in the art may appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

I claim:

1. A clock conditioning system, comprising:
   first and second input clock buffers for receiving respective first and second input clock signals;
   a plurality of latches, each comprising a first and second clock input terminal;
   a plurality of first output clock buffers, each having an input coupled to an output of the first input clock buffer and an output coupled to the first clock input terminal of one of the plurality of latches; and
   a plurality of second output clock buffers, each having an input coupled to an output of the second input clock buffer and an output coupled to the second clock input terminal of one of the plurality of latches.

2. The system of claim 1, wherein the first and second input clock buffers are inverters.

3. The system of claim 1, wherein each of the first and second output clock buffers are inverters.

4. The system of claim 1, wherein the number of latches is equal to the number of first and second output clock buffers.

5. The system of claim 1, wherein the number of latches is greater than the number of first and second output clock buffers.

6. The system of claim 1, wherein the plurality of latches are manufactured in an M-bit digital to analog converter ("DAC") comprising M latches.

7. The system of claim 1, wherein the first and second input clock buffers are non-inverting buffers.

8. The system of claim 1, wherein the first and second output clock buffers are non-inverting buffers.

9. A multi-bit latch clock conditioning system, comprising:
   first and second input clock buffers for receiving respective first and second input clock signals;

a multi-bit latch having a plurality of latch stages, each latch stage comprising a first and second clock input terminal;

a plurality first output clock buffers, each having an input coupled to an output of the first input clock buffer and an output coupled to the first clock input terminal of one of the plurality of latches; and a plurality second output clock buffers, each having an input coupled to an output of the second input clock buffer and an output coupled to the second clock input terminal of one of the plurality of latches.

10. The system of claim 9, wherein the first and second input clock buffers are inverters.

11. The system of claim 9, wherein each of the first and second output clock buffers are inverters.

12. The system of claim 9, wherein the number of latch stages is equal to the number of first and second output clock buffers.

13. The system of claim 9, wherein the number of latch stages is greater than the number of first and second output clock buffers.

14. The system of claim 9, wherein the multi-bit latch is manufactured in a digital to analog converter.

15. A method for conditioning clock signals for multi-bit latch stages, comprising:

buffering a first and second clock input signal to generate intermediate first and second clock signals;

distributing the intermediate clock signals through a predetermined number of clock distribution branches, wherein each branch includes a respective pair of intermediate first and second clock signals;

buffering a predetermined number of the intermediate clock signal pairs to generate first and second output clock signals; and distributing the first and second output clock signals to stages of the multi-bit latch.

16. The method of claim 15, wherein the predetermined number of buffered output clock signals is equal to the number of multi-bit latch stages.

17. The method of claim 15, wherein the predetermined number of buffered output clock signals is less than the number of multi-bit latch stages.

* * * * *